(12) United States Patent
Colombo et al.

(10) Patent No.: US 8,010,333 B2
(45) Date of Patent: Aug. 30, 2011

(54) PROCESS FOR DEVELOPING AND IMPLEMENTING A MODEL FOR THE FORMAL DESCRIPTION OF A COLLABORATIVE SYSTEM COMPRISED OF MULTIPLE DISTRIBUTED COMPONENTS, ESPECIALLY AN INTELLIGENT, FLEXIBLE PRODUCTION AND/OR PROCESS AUTOMATION SYSTEM

(75) Inventors: Armando Walter Colombo, Karlstein a. M. (DE); Ronald Schoop, Hainburg (DE)

(73) Assignee: Schneider Electric GmbH, Seligenstadt (DE)

( * ) Notice: Subject to any disclaimer, the term of this patent is extended or adjusted under 35 U.S.C. 154(b) by 1497 days.

(21) Appl. No.: 10/991,951

(22) Filed: Nov. 19, 2004

(65) Prior Publication Data

US 2006/0015315 A1   Jan. 19, 2006

(30) Foreign Application Priority Data

Nov. 19, 2003   (DE) .................................. 103 54 146

(51) Int. Cl.
*G06F 17/50*   (2006.01)
(52) U.S. Cl. .................. 703/13; 703/7; 703/4; 700/100; 700/96; 700/99; 700/113
(58) Field of Classification Search .................... 700/32, 700/99, 96; 703/6, 2; 379/10.03; 707/100; 717/105
See application file for complete search history.

(56) References Cited

U.S. PATENT DOCUMENTS

| 5,608,908 | A | * | 3/1997 | Barghouti et al. ............ 719/318 |
| 5,907,706 | A | * | 5/1999 | Brodsky et al. ............... 717/105 |
| 5,980,096 | A | * | 11/1999 | Thalhammer-Reyero .... 707/100 |
| 6,011,830 | A | * | 1/2000 | Sasin et al. ................. 379/10.03 |
| 6,185,469 | B1 | * | 2/2001 | Lewis et al. ..................... 700/99 |
| 6,256,598 | B1 | * | 7/2001 | Park et al. ......................... 703/2 |
| 6,349,237 | B1 | * | 2/2002 | Koren et al. .................... 700/96 |
| 6,725,428 | B1 | * | 4/2004 | Pareschi et al. ............... 715/530 |
| 6,778,863 | B1 | * | 8/2004 | Lienhard et al. ................ 700/32 |
| 6,789,054 | B1 | * | 9/2004 | Makhlouf ......................... 703/6 |
| 2004/0111700 | A1 | | 6/2004 | Colombo | |

OTHER PUBLICATIONS

S. Ben Ahmed I, M. Moalla, M. Courvoisier Towards a Design Methodology for Flexible Manufacturing Systems Command Combining SA-RT and Object Petri Nets 0-7803-4/95, IEEE 1995.*
AnneMarie Ferraro, Edwin H. Roger Evolution of Virtual Objects in Petri Net Modeled Collaborative Behavior 0-7803-4778-1/98, IEEE 1998, pp. 166-171.*
Ronald Schoop, Ralf Neubert, Armando W. Colombo A Multiagent-based Distributed Control Platform for Industrial Flexible Production Systems 0-7803-7108-9/01, IEEE 2001, pp. 279-284.*

(Continued)

*Primary Examiner* — Kamini S Shah
*Assistant Examiner* — Cuong V Luu
(74) *Attorney, Agent, or Firm* — Dennison, Schultz & MacDonald

(57) ABSTRACT

Process for developing and implementing a model (ASM) for the formal description of a collaborative system including multiple, distributed components, wherein analyzable models of the components are generated via simulation processes. The invention includes the steps of generation of models of collaborative units, preparation of a catalog of models of the collaborative units, assignment of a set of rules to the catalog for the specification of interactions among the autonomous models of the collaborative units and for the development of the model of the complex collaborative system, generation of the desired model using selected models of the collaborative units as the basic module from the catalog, and taking selected rules into account, and automatic adaptation of the model by deriving new rules, taking into account evaluation parameters for each application in one process operation.

7 Claims, 2 Drawing Sheets

OTHER PUBLICATIONS

Armando Colombo, Ralf Neubert, Borris Sussmann A Colour Petri Net-based Approach Toward a Formal Specification of Agent-Controlled Productino Systems IEEE 2002 SMC TA1C5.*

International Standard ISO/IEC 15909 High-level Petri Nets—Concepts, Definitions and Graphical Notation, Final Draft International Stansard ISO/IEC 15909 Version 4.7.1, Oct. 28, 2000.*

J.-E. Hong, D.-H. Bae High-level Petri net for incremental analysis of object-oriented system requirements IEE Proceedings online No. 20010242, IEE Proc-Softw., vol. 148, No. 1, Feb. 2001.*

Francsico Restivo, Armando W. Colombo, Paulo Leitao A Formal Validation Approach for Holonic Control System Specifications 0-7803-7937-2/03, IEEE Sep. 2003.*

A. Nketsa, R. Valette Rapid and modular prototyping-based Petri nets and distributed simulation for manufacturing systems Applied Mathematics and Computation 120 (2001) pp. 265-278.*

Vasilis C. Gerofiannis, Achilles D. Kameas, Panayotis E. Pintelas comparative study and categorization of high-level petri nets The Journal of Systems and Software 43 (1998) pp. 133-160.*

Feldmann et al, IEEE Transactions on Control Systems Technology, Nov. 1999, 7:657-665.

Feldmann et al, IEEE Transactions on Control Systems Technology, Nov. 1999, 7:666-674.

Colombo et al, Computer Assisted Management and Control of Manufacturing Systems, Tzafestas (Ed.), pp. 297-324, Jan. 1997.

Colombo, Integration of High-Level Petri Net-based Formal Methods for the Supervision of Flexible Production Systems, 1st Online Symposium of Electronics Engineers, 2001.

Sussmann et al, Simulation in Industry 2001, pp. 929-933.

* cited by examiner

PROCESS FOR DEVELOPING AND IMPLEMENTING A MODEL FOR THE FORMAL DESCRIPTION OF A COLLABORATIVE SYSTEM COMPRISED OF MULTIPLE DISTRIBUTED COMPONENTS, ESPECIALLY AN INTELLIGENT, FLEXIBLE PRODUCTION AND/OR PROCESS AUTOMATION SYSTEM

BACKGROUND OF THE INVENTION

The invention relates to a method for developing and implementing a model for the formal description of a collaborative system comprised of multiple distributed components.

Recent production technologies show a worldwide trend both toward small and medium batch sizes and toward product families of greater diversity. This tendency frequently is in opposition to the requirement for improved productivity in the sense of a decrease in production time and a simultaneous increase in the degree of utilization of machinery.

From the state of the art, industrially flexible production systems are known which possess the capability of achieving a broad palette of different product families or different product types efficiently and with minimal changes to their production environment. However, flexibility concepts of this type require complex design methods and control systems, as the degree of flexibility of the entire system is dependent not only upon the flexibility of the individual components of the production system, but to a much greater degree upon the automation system upon which the production system is based and, e.g., upon its intelligence, its architecture, its interfaces, and its distribution throughout the whole system.

Interactions and complicated links exist between a production system and its associated control system with respect to their structure and behavior.

At the present time, the methods and processes related to cost reduction and a detailed design process for an industrially flexible production system are inadequate.

In the article by Süssmann, B., i.a.: Configuration of agent-oriented manufacturing systems using a petri net-based simulation approach, in: Simulation in Industry '2001, 13$^{th}$ ESS'2001. SCS Europe Bvba, Oct. 18-20 2001, pp 929-933), a method for configuring an agent-based manufacturing system using a formulation based upon a petri net simulation is described. In this, petri net models of hardware components for the manufacturing system are compiled to form a so-called coordination-control model. From the coordination-control model, as a result of analysis using discrete event-oriented simulation processes, information for describing the system and for optimizing both the system layout and the manufacturing process are then derived.

At the same time, the coordination-control model forms a skeleton for a discrete, event-oriented control structure, from which information for the control system can be derived.

Finally, a formulation designed for linking the petri net-based simulation of the hardware of a production or manufacturing system with agent-oriented manufacturing control technology is described. In this process method also, first a coordination-control model is generated from the models of the individual hardware components of the given manufacturing system. From that model, a multi-agent control platform for the manufacturing system is then generated. From this overall system, agent-based decisions can be made, and interaction patterns among the agents for controlling the manufacturing process can be designed. Analysis is accomplished via simulation processes.

An article by A. W. Colombo, "Integration of High-Level Petri Net-Based Formal Methods for the Supervision of Flexible Production Systems", Tutorial Lecture at the 1$^{st}$ Online Symposium of Electronics Engineers, 2001, addresses tools and methods for the design, testing, and implementation of a flexible production system, however it must be noted that these tools and methods differ from those used in the design, testing, and implementation of the associated control system.

The above-described formulations are suitable only for modeling and describing already known manufacturing systems, i.e. known with respect to their layout and their hardware components, and if necessary for deriving software structures in a second phase.

The articles by K. Feldmann, A. W. Colombo, i.a., "Specification Design and Implementation of Logic Controllers Based on Colored Petri Net Models and the Standard IEC 1131 Part II: Specification and Design" (IEEE, November 1999, VOL 7, pp 657-665), and K. Feldmann, A. W. Colombo, i.a., "Specification, Design and Implementation of Logic Controllers Based on Colored Petri Net Models and the Standard IEC 1131 part II: Design and Implementation" (IEEE November 1999, VOL 7, pp 666-674), deal with the description and the design as well as the implementation of control systems based upon colored petri nets. Another article by A. W. Colombo and R. Carelli, "Petri Nets for Determining Manufacturing Systems" from Sypros G. Tzafestas "Computer-Assisted Management and Control of Manufacturing Systems", Springer Publishers, the content of which is included in this application, relates to the use of petri nets to simulate production systems. No reference to multi-agent-based control systems is made in the articles.

Without the proper control software a production system is useless. It is the control software that organizes production and plans and synchronizes the allocation of resources. Furthermore, the reliability and the degree of flexibility of the production system is determined not only by the reliability and flexibility of the mechatronic components such as the work station and the warehousing, handling and transport systems, but also to a significant degree by the reliability and flexibility of the control system. Due to the large-scale interaction among the various components of the production system and the multitude of executed functions, a control system for an intelligent production system according to the current state of the art is designed and implemented separately from the production system.

Specifically, the implementation of a state of the art, agent-based control system is performed manually. Here an interactive process is used, customarily comprising a number of steps. In addition, the accuracy and/or precision of the design can be confirmed only when the implementation of the flexible production system has been completed. Because the control software is created separately from the design and implementation of the production system it is to control, the entire process requires a great deal of time, leads easily to misunderstandings and errors, and as a result is, for the most part, highly cost intensive.

From the German patent application 102 24 650 a process in known in which, using a discrete, event-oriented formal simulation process, preferably one based upon high-level petri nets, hereinafter called HLP nets, and/or expanded colored petri nets, hereinafter called KOLP nets, the entire development process for an industrially flexible production system and its multi-agent-based control system is supported from the requirements analysis phase, through modeling, up to validation. Such processes are designed to link models with reality, i.e. for example to process sensor signals that are used in simulation.

In this, the modeling and validation of the flexible production system and its multi-agent-based control system are integrated within a single design phase.

HLP nets as formal methods for creating models for an industrially flexible production system are characterized especially in that the models generated using these methods can be directly transformed to models of a multi-agent-based control system logic, and can subsequently be implemented. In addition, it is guaranteed that the demand for applicability and flexibility of the overall system will be met.

Assuming a predetermined hardware and software configuration for an industrially flexible production system, and based upon the information regarding the tasks and functions that must be realized within the system, the following preferred process method is proposed:

- Generation of a simulation model, preferably based upon HLP nets for each component of the flexible production system, accounting for sequence-based specifications,
- Generation of a simulation model for interfaces such as communication interfaces and/or sensor-actuator interfaces for each component within a logic control structure derived from the simulation model, accounting for mechatronic specifications,
- Validation of the specifications for each modeled component and the associated control structure,
- Generation of a coordination model of the components and/or the agents based upon the specifications of a layout of the flexible production system, preferably accounting for both contentious and cooperative behavior among the components, wherein the coordination model serves as the basis for the multi-agent-based control structure of the flexible production system.

From the validation of structural and dynamic specifications for the multi-agent-based control structure and/or the layout of the flexible production system, and the behavior of the flexible production system, information is received, especially with respect to sequence strategies, conflicts, autonomous and/or cooperative decision-making processes, coordination, contention, product specification and/or control commands, etc. that may occur in the system. This is followed by the generation, testing and optimization of specifications for the multi-agent-based control structure and the associated sequence control strategy for the flexible production system that is to be controlled.

With regard to the process step in which a coordination model for the components and/or the agents is generated based upon specifications for the layout of the flexible production system, it should be noted that in this an agentification of a flexible production system from the HLP net-simulation model is continuously derived. The coordination model serves as the basis for the multi-agent-based control structure of the flexible production system.

Every simulation model contains structural and dynamic characteristics of the modeled production components. If the coordination model is generated from the individual models, both physical and logical interactions among the production components are observed. From the point of view of the production system, the coordination model is a representation of the hardware (production system). From the point of view of the control system, the coordination model is a representation of the control system (topology+intelligence).

The physical interactions are characterized in the implementation phase of the multi-agent-based control system by the future exchange of mechatronic signals between the control system and the production system.

The logic interactions are based predominantly on production specifications and/or production strategies, which the multi-agent-based control system must control and monitor. The quality of the control and monitoring activities is characterized by how much intelligence the control system has (intelligence in the sense of optimal and/or pseudo-optimal decisions in the solution of conflicts). The HLP net-based simulation models represent a skeleton of the multi-agent-based control system, and they are capable of identifying conflicts, providing the necessary production and control information for the decision-making process, and especially validating and/or optimizing the outcome of the solution of conflicts. The result of this is that the simulation model not only represents the multi-agent-based control structure, but also allows the design and/or the optimization of the behavior of this multi-agent-based structure, which is emphasized as a particular advantage of the process of the invention.

The formulation presented above describes a formal process for modeling and validating agent-based control systems for flexible production systems using HLP net models. With this, an initial identification of functionally intelligent units is possible, in other words hardware and software units as intelligent elements in a distributed, network-based production system. The units can be identified over the course of their life cycle and in their various hierarchy levels, in other words ranging from an individual element in the overall assembly up to the entire production system. The positioning of the units (hierarchy level) and their distribution within the overall system is referred to as heterarchy. A distributed and hierarchical system can thus be defined as a heterarchical system.

SUMMARY OF THE INVENTION

The object of the present invention is to further improve upon a process of the type described above such that the development and implementation of a model for formally describing a collaborative system comprised of multiple distributed components is simplified.

Pursuant to the invention, a catalog of models of standardized collaborative units, i.e. basic modules for the system that operate in conjunction with one another, is established, and the catalog is assigned a set of rules for the specification of interactions among the models of the collaborative units and for the configuration of the model of a complex collaborative system. The set of rules may also be a component of the catalog.

Based upon the process described in the patent application 102 24 650, with only one formulation and with the gradual improvement of the HLP net model of the components, the control specification for a collaborative unit and a complex collaborative system, which is comprised of collaborative units, can be generated according to demand requirements in one operation. That means that it is not necessary for two catalogs to exist, one for the mechanical systems and another for the control/software; rather, only one catalog exists. The models of the collaborative units that are contained therein can be used with varying degrees of precision, based upon the requirements of the user.

According to the invention, the hardware/software components contained in the catalog, as well as the intelligence in the form of models representing cooperation information are linked to a set of rules for specifying interactions among the collaborative units, and for the configuration of complex collaborative systems. Based upon the outcome of this formulation, the creation and/or definition of rules for modeling collaborative systems and the creation and/or definition of evaluation parameters for each application follows.

In one preferred process method, the models of the collaborative units are represented by high-level petri nets (HLPN) or expanded colored petri nets (KOLPN). An analysis of the models of the collaborative units and/or the compiled model is implemented via a discrete, event-oriented simulation process and/or a formal validation and/or analysis process based upon functional analysis.

It is further provided that models of collaborative units are generated based upon components possessing various levels of precision, for example a module for a machine, a machine component, a sensor, an actuator, or a peripheral system. Humans may also be viewed as collaborative units.

In addition, according to one preferred process method it is provided that models of collaborative units are generated based upon reusable components. By generating models of collaborative units with differing degrees of precision and models of reusable components, a substantial simplification in the synthesis of new systems is achieved.

For the purpose of cataloging it is further provided that the models of the collaborative units are generated based upon standardized hardware components. This makes it possible to produce a catalog of models for different production and/or process scenarios.

With respect to agent-based control units, one preferred process method consists in using predefined components. Based upon the formulation regarding HLP net models of hardware components, these serve as a skeleton for corresponding agent-based control units. In these, primary functions such as control, monitoring, diagnostics, decision-making processes, preventive and/or precautionary maintenance and repair measures can thus be implemented.

BRIEF DESCRIPTION OF THE DRAWINGS

Further details, advantages, and characterizing features of the invention are disclosed, not only in the claims, the characterizing features contained therein—alone and/or in combination—but also in the exemplary embodiment found in the following description.

The drawings show.

DESCRIPTION OF THE PREFERRED EMBODIMENTS

Figure 1:
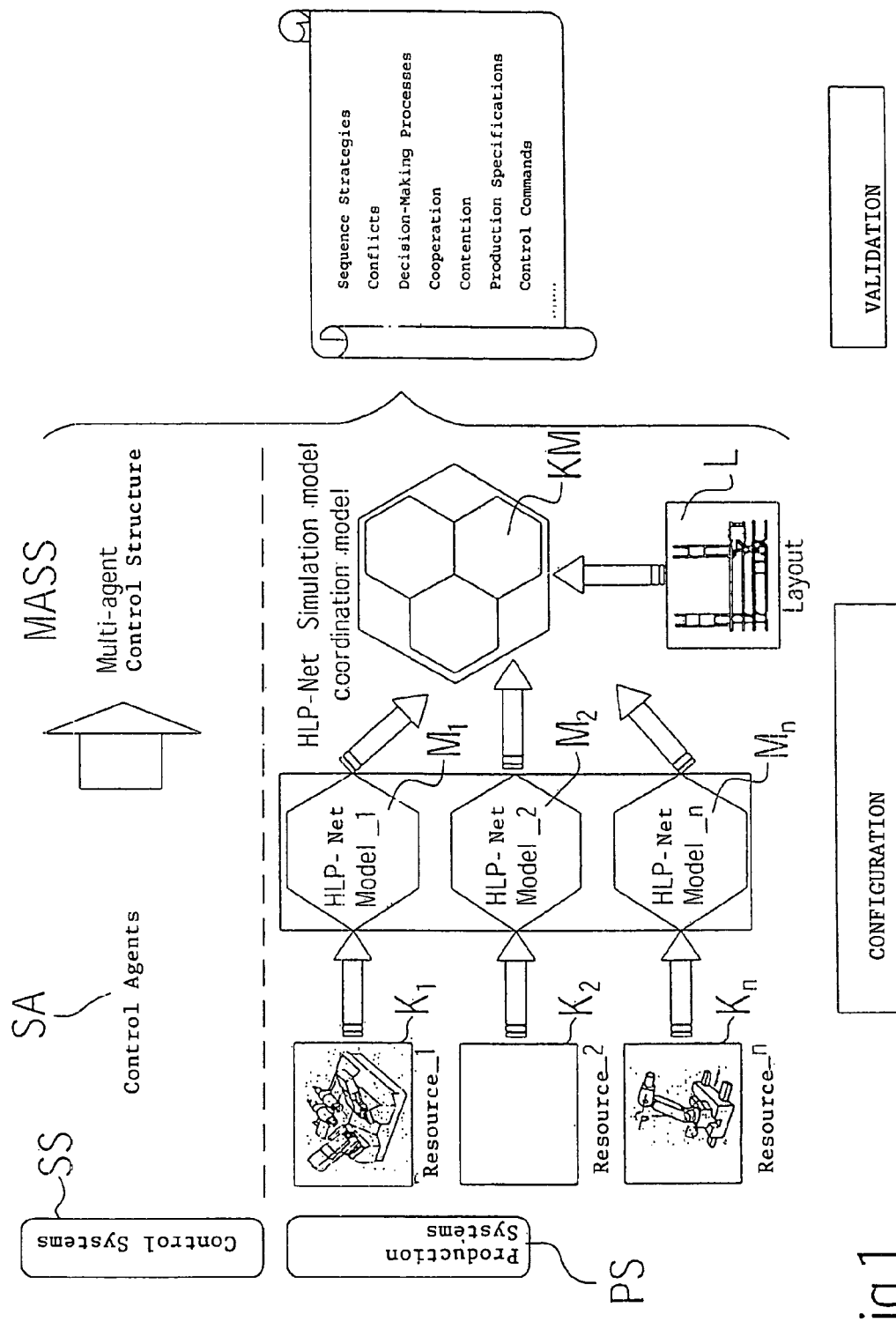
FIG. 1 a schematic representation of a process for developing a coordination model and FIG. 2 a schematic representation of a process for developing and implementing a collaborative production automation system.

FIG. 1 shows a schematic representation of the process. First, for each component K1 . . . KN in a flexible production system PS, simulation models M1 . . . MN are generated based upon HLP nets, which models are compiled to form an HLP net coordination model KM, which ultimately represents a layout L, i.e. the mechanical design for the flexible production system. In other words, an HLP net model is derived from the necessary decisions of the process or the process control, in order to afford the developer the option of proceeding straight from the production area to the multi-agent-based development area.

Finally, control agents SA of the control system SS are derived from the HLP net-based model of the components of the production system, i.e. a mapping takes place from the production process and the production specifications to an agent-oriented concept via the identification of the agents and their capabilities, with capabilities referring to their autonomy and collaborative behavior.

Afterward, a multi-agent-based control platform for the production system is configured, using information on the coordination model KM for the production system that is based upon the HLP net. This is followed by the identification of agent-based decisions and the design of interactive processes among agents for the control (dynamic planning) of the production environment.

On this basis, a qualitative analysis and formal validation of structural and behavioral specifications, such as sequence strategies, conflict situations, decision-making processes, cooperation, contention, product specifications, control commands, etc. for the agent-oriented production system is performed using formal methods of analysis in combination with the mathematical foundations of the HLP net-based simulation model. This is followed by a mapping of transitional and stationary currents for the HLP net-based model over the set of distributed control and product specifications. Finally a validation of structural and dynamic specifications for the multi-agent-based control structure and/or the layout and behavior of the flexible production system is performed, using methods of analysis in combination with the mathematical bases of the HLP-net-based simulation models. Further, a validation of the performance specifications for the production environment takes place, if this is established and monitored via the agent-based control system.

The process generates a set of qualitative and quantitative criteria that are based upon the agents, in order to improve their "social behavior", i.e. their performance among themselves and their future interactions within the production environment.

Because of their expandability and modular design, the developed HLP-net simulation models have a multitude of advantages:

Specifications of production and agent-based control systems can be generated and validated together, Projection and validation of flexible production systems and multi-agent-based control systems are viewed together and run simultaneously, wherein the interactions between the two components are taken into account, Accuracy and/or precision of the design of the control system can be confirmed before the implementation of the flexible production system is completed, and The formal representation of the flexible production system and the multi-agent-based control system integrated therein can be viewed as a single unit, which can be utilized both by the production engineer and by the developer, e.g. to generate test cases in both areas (production and control).

The term HLP net used here is to be identified with expanded, colored petri nets used in information and system theory. This means that the structure of the net is completed using supplementary data and functions, and that the dynamic behavior of the net can be formalized on the basis of the functional analysis. The components of a model are viewed as objects that represent tangible components of a system (both static and dynamic): in this case production and/or control components and agents.

In contrast to the current state-of-the-art solution, the process of the invention can present a substantial potential savings in time and money through the use of HLP-net simulation models of industrially flexible production systems and their multi-agent-based control structures that are continuous, platform-independent, configurable, and usable in actual operation.

The process of the invention permits the planning, definition, and formal specification of an "encapsulation process" in networked
systems such as industrial production systems, when the components of the system such as mechanics, control and intelligence are viewed as being integrated into a collaborative unit, such as an automation unit. Due to their inherent capability for autonomous behavior and especially for cooperation and collaboration with other units, such a "capsule" can also be referred to as a "collaborative unit" or "collaborative automation unit" (CAU).

As mentioned above, the HLP-net-based formulation facilitates the integration of three aspects such as mechanics, control and intelligence. In this, the three mentioned aspects are developed and implemented in a unified manner.

The models of the collaborative units can be viewed as basic modules. With these modules a complete model of a network-based system such as an automation system can be constructed and specified formulaically. For this it is necessary to take into account a set of specifications: 1. the formal architecture, 2. the functions to be executed and 3. connections and/or communications between the modules.

Figure 2:
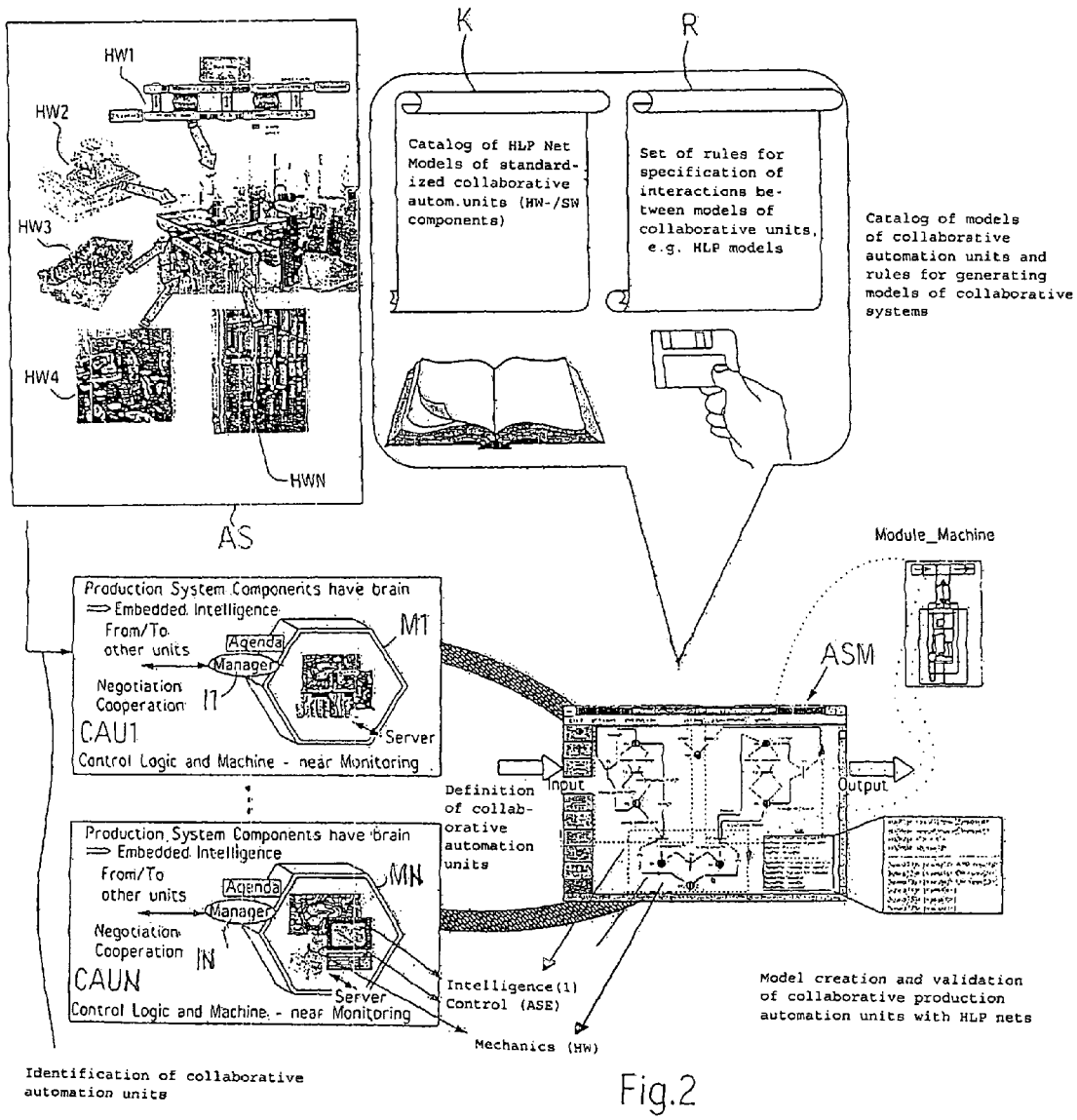

FIG. 2 shows a schematic representation of a process for developing and implementing a model for a collaborative production automation system. Based upon a tangible automation system AS comprising the hardware components HW1-HWN, which represent, for example, reusable components, first an identification of modules, in other words collaborative units CAU1-CAUN, which possess the inherent ability for autonomous behavior and especially for cooperation and collaboration with other units, is performed. To this end, special interfaces I1, I2 or S1, S2 are provided. Due to the formulation regarding HLP networks, the collaborative units CAU1-CAUN already contain the integration of hardware components (mechanics), software components (control) and information I (intelligence) for their collaboration. From the collaborative units CAU1-CAUN, models are generated using HLP net processes, with which a complete model of a network-based automation system ASM can be constructed and formulaically specified.

Pursuant to the invention it is provided that an identification of basic modules, in other words collaborative units CAU1, CAU2, in various levels of precision takes place, which means that a collaborative unit can represent, for example a machine, a machine component, a sensor, an actuator, or peripheral systems. A simplification takes place to the extent that reusable basic modules are developed, such as hardware components, which thus can be represented by HLP net models. The basic modules for HW components established in this manner should be represented by standardized HLP net models. According to the invention a catalog K of models M1-MN for various production scenarios can thus be generated. It is further advantageous to standardize the component models M1-MN.

Regarding the agent-based control units, it should be noted that each HLP net model for a hardware component HW1-HWN is viewed as a skeleton for a corresponding agent-based control unit ASE1-ASEN, which is a component of the collaborative units CAU1-CAUN. In these control units, primary functions such as control, monitoring, diagnostics, decision-making processes, preventive and corrective maintenance measures are already contained. The quantity and quality of the information contained in the structure of the HLP net model of the agent-based control units ASE1-ASEN support the above-mentioned monitoring functions. The results of the formal analysis of the models M1-MN complete the set of information parameters, in other words the intelligence I, which is necessary to support the collaborative automation unit CAU1-CAUN.

The SW components, i.e. the agent-based control units ASE, are derived from the HLP net models of the hardware components HW1-HWN, and are
contained in the catalog K. The catalog K contains models of various HW/SW components as well as information for various production scenarios.

As a result, with only one formulation and with the gradual improvement of the HLP net model of the HW components, the control specifications for a collaborative unit CAU1-CAUN can be automatically generated. This means that there are not two catalogs K, but only one catalog K. The models M1-MN of the collaborative units CAU1-CAUN, which are contained in the catalog K, can be used with varying degrees of precision, based upon the requirements of the user.

The catalog K of the models contains the results of the formal validation of the specifications, both structurally and as relates to their behavior, when HW and/or SW components HW.ASE and their associated intelligence I are completely integrated into each model M1-MN.

Based upon the outcome of the above-mentioned formulation, the definition and/or creation of rules R for modeling the model ASM of the collaborative system, and the definition and/or establishment of evaluation parameters for every application thus follows.

In the cataloging, it must be ensured that both contention and cooperation, in other words relationships among the collaborative units CAU1-CAUN, and limitations and rules for the generation of HL-PN-based models of the collaborative units CAU1-CAUN, are retained as results. For example, rules for monitoring sequential and/or parallel and interactive exclusion relationships and partial resource functions, etc. are generated.

The result of the assembly of production and/or process components was designated above as the coordination model KM. The set of rules that is assigned to the catalog K according to the invention, or that is contained in this or in some catalog section now permits the improvement of the structure and the behavior of the model ASM for use as a formal specification for a complete collaborative automation scenario.

In summary, an automatic system adaptation is thereby possible. The model ASM is capable of making decisions at the system level, supporting one of the primary functionalities of a collaborative automation system, such as collaboration and/or cooperation, e.g. the ability to insert new hardware, i.e. new models, in the catalog, the removal and replacement of components, new production specifications for new products, new decisions and/or new factors for decision-making.

Due to the intelligence that is built into the system, the system is capable, e.g., of ordering replacement parts for faulty components or for components that will require regular maintenance in the future. In addition, expansion components can be independently ordered when new requirements are necessitated by the process.

It is within the scope of the invention for the above-used term "component" to also be interpreted as "function". The process of the invention makes it possible to create an intelligent system, such as an intelligent flexible automation system, from individually, previously described, i.e. previously defined, functions, such as mechanical functionality, software functionality and dialog capability. The intelligent systems can, for example, be used in both the manufacturing and the processing fields, where, for example, chemical processes are used. Through the comprehensive, complete description of all the above-named functions of the individual building blocks of the system, the system is created in one process operation in the sense of a compilation.

Pursuant to the invention, rules are provided, which, based upon the description of the individual functions, i.e. the description of mechanical functionality, software functionality and dialog capabilities, allow a system to be created in one process operation.

Furthermore, the description of the models via HLPN is particularly suitable, as a large amount of information can be described using complex functions, which, in contrast, would not be possible with the use of traditional petri nets.

The invention claimed is:

1. A computer-implemented process, for developing and implementing a system-model (ASM) for the formal description of a real flexible production- and/or process-automation system (AS) comprised of multiple, distributed real components (HW1-HWN), with hardware (mechanic) and software (control), wherein for each hardware (mechanic) of the real components (HW1-HWN), an analyzable high-level-Petri Net model is generated via simulation processes, comprising the sequential steps of:

identifying collaborative units (CAU1-CAUN) suitable to realize different production and/or process scenarios as autonomous basic modules based upon the hardware (mechanic) and the software (control) of the real components (HW1-HWN), generating a high-level-Petri net model (M1-MN) for each of the collaborative units (CAU1-CAUN) using an analytical process based upon functional analysis, wherein at least one model (M1-MN) of a said collaborative unit (CAU1-CAUN) contains the high-level-Petri net model of the hardware (mechanic) of the at least one real component (HW1-HWN), as a skeleton of an agent-based-control unit (ASE1-ASEN) which is derived from the high-level-Petri net model of said hardware (mechanic) of said real component (HW1-HWN), intelligence (I1-IN) in the form of information on autonomous behavior with respect to cooperation with other models (M1-MN) of collaborative units (CAU1-CAUN), and an interface for cooperation and collaboration with other models (M1-MN) of collaborative units (CAU1-CAUN), preparing a single catalog (K) with said models (M1-MN) of the collaborative units (CAU1-CAUN), each of said models being listed as an autonomous basic module model, wherein said single catalog (K) of said models (M1-MN) contains the results of a formal validation of structural and behavioral specifications of said collaborative units (CAU1-CAUN), assigning a set of rules (R) to said catalog (K) for the specification of interactions among said autonomous models (M1-MN) of the collaborative units (CAU1-CAUN) and for the development of the system-model (ASM) of said real collaborative system (AS), generating the desired system-model (ASM) by connecting a selection of said models (M1-MN) of the collaborative units as the basic module from said catalog (K), and taking a selection of said rules (R) into account, whereby the models (M1-MN) interact with each other over said interfaces on the basis of said selected rules (R), automatically adapting the system-model (ASM) by deriving new rules (R), taking into account model evaluation parameters for each different modeled production and/or process scenario.

2. Process pursuant to claim 1, wherein the models of the collaborative units (CAU1-CAUN) are generated on the basis of expanded colored Petri nets (KOPLN).

3. Process pursuant to claim 1, wherein models (M1-MN) of collaborative units (CAU1-CAUN) are generated on the basis of components (HW1-HWN) having varying levels of precision, a module of a machine, a machine component, a sensor, an actuator, or a peripheral system.

4. Process pursuant to claim 1, wherein models (M1-MN) of collaborative units (CAU1-CAUN) are generated on the basis of reusable components (HW1-HWN).

5. Process pursuant to claim 1, wherein a discrete, event-oriented simulation process and/or a validation are used as the simulation process.

6. Process pursuant to claim 1, wherein the catalog (K) contains standardized models (M1-MN) of collaborative units (CAU1-CAUN).

7. Process pursuant to claim 1, wherein in the agent-based software unit (ASE1-ASEN) derived from the models (M1-MN) of the collaborative units (CAU1-CAUN), at least one primary function selected from the group consisting of control, monitoring, diagnostics, decision-making processes, preventive and corrective maintenance are implemented.

* * * * *